United States Patent
Yang et al.

(10) Patent No.: US 10,050,896 B2
(45) Date of Patent: Aug. 14, 2018

(54) MANAGEMENT OF AN OVER-SUBSCRIBED SHARED BUFFER

(71) Applicant: Cavium, Inc., San Jose, CA (US)

(72) Inventors: Andrew Chao-Lung Yang, Cupertino, CA (US); Jeffrey Alan Pangborn, Saratoga, CA (US); Gerald Schmidt, San Jose, CA (US)

(73) Assignee: Cavium, Inc., San Jose, CA (US)

( * ) Notice: Subject to any disclaimer, the term of this patent is extended or adjusted under 35 U.S.C. 154(b) by 146 days.

(21) Appl. No.: 14/542,509

(22) Filed: Nov. 14, 2014

(65) Prior Publication Data

US 2016/0142317 A1    May 19, 2016

(51) Int. Cl.
*H04L 12/28* (2006.01)
*H04L 12/835* (2013.01)

(52) U.S. Cl.
CPC .................. *H04L 47/30* (2013.01)

(58) Field of Classification Search
USPC .... 370/235.1, 381, 382, 389, 395.7, 395.71, 370/395.72, 412, 413, 428, 429
See application file for complete search history.

(56) References Cited

U.S. PATENT DOCUMENTS

| | | | | |
|---|---|---|---|---|
| 6,246,682 B1* | 6/2001 | Roy | .................... | H04L 12/5601 370/390 |
| 6,687,254 B1* | 2/2004 | Ho | .......................... | H04L 47/24 370/230 |
| 7,007,071 B1* | 2/2006 | Brown | .................... | H04L 47/30 370/395.7 |
| 7,802,028 B2* | 9/2010 | Andersen | ............ | H04L 12/5693 370/229 |
| 8,848,724 B2* | 9/2014 | Voruganti | ........... | H04L 49/9078 370/229 |
| 2003/0117958 A1* | 6/2003 | Nation | .................... | H04L 47/10 370/235 |
| 2003/0223442 A1* | 12/2003 | Huang | .................... | H04L 47/10 370/412 |
| 2004/0042477 A1* | 3/2004 | Bitar | .................... | H04L 12/5693 370/412 |
| 2005/0044206 A1* | 2/2005 | Johansson | ............... | H04L 47/10 709/224 |
| 2006/0092837 A1* | 5/2006 | Kwan | .................... | H04L 47/10 370/229 |
| 2007/0104195 A1* | 5/2007 | Tatapudi | ............. | H04L 45/7453 370/390 |
| 2007/0248009 A1* | 10/2007 | Petersen | ............. | H04L 12/4633 370/230 |
| 2007/0253411 A1* | 11/2007 | Arad | ........................ | H04L 47/10 370/389 |
| 2007/0280277 A1* | 12/2007 | Lund | .................... | H04L 49/205 370/412 |

(Continued)

*Primary Examiner* — Kwang B Yao
*Assistant Examiner* — Nguyen Ngo
(74) *Attorney, Agent, or Firm* — Haverstock & Owens LLP (57) ABSTRACT

A method of managing a buffer (or buffer memory) includes utilizing one or more shared pool buffers, one or more port/priority buffers and a global multicast pool. When packets are received, a shared pool buffer is utilized; however, if a packet does not fit in the shared pool buffer, then the appropriate port/priority buffer is used. If the packet is a multicast packet, then the global multicast pool is utilized for copies of the packet.

52 Claims, 6 Drawing Sheets

(56) References Cited

U.S. PATENT DOCUMENTS

| | | | |
|---|---|---|---|
| 2008/0192765 A1* | 8/2008 | Oh | H04L 49/90 370/412 |
| 2014/0036930 A1* | 2/2014 | Lih | H04L 49/252 370/429 |
| 2014/0105218 A1* | 4/2014 | Anand | H04L 47/6255 370/412 |
| 2014/0185442 A1* | 7/2014 | Newman | H04L 49/9036 370/235 |
| 2015/0180787 A1* | 6/2015 | Hazelet | H04L 47/30 370/235 |

* cited by examiner

MANAGEMENT OF AN OVER-SUBSCRIBED SHARED BUFFER

FIELD OF INVENTION

The present invention relates to management of a shared data buffer.

BACKGROUND OF THE INVENTION

Network switches are used to connect multiple devices on the same computer network within an area. For example, a switch is able to connect computers, printers and servers, creating a network of shared resources. The switch serves as a controller, allowing the various devices to share information with each other.

There exist two basic types of switches: managed and unmanaged. An unmanaged switch does not provide for a user to make changes to the way in which the switch allows devices on the network to share information. A managed switch provides a user the ability to monitor and control how the switch allows the connected devices to share information. A managed switch provides greater flexibility because the switch is able to be monitored and adjusted locally or remotely to exert control over network packet traffic.

A network packet is a formatted unit of data carried by a packet-switched network. The beginning of each packet may provide packet details such as where the packet is going, where the packet came from, the type of the packet, and other administrative details. This part is called the "packet header." The rest of the packet, containing the actual data being transmitted, is referred to as the "packet body." Packets are stored temporarily during the transmission of information to create a reserve for use during packet transmission delays or during a retransmission request. Buffering provides the necessary storage to synchronize packets and request and replace those lost during transmission.

As the number of senders to a switch increases, the total buffering for packet storage begins to consume a significant amount of area. For a sharable buffer space receiving data from multiple senders at the same data rate, the buffer space typically grows linearly as the number of senders is increased.

BRIEF SUMMARY

A method of managing a buffer (or buffer memory) includes utilizing one or more shared pool buffers, one or more port/priority buffers and a global multicast pool. When packets are received, a shared pool buffer is utilized; however, if a packet does not fit in the shared pool buffer, then the appropriate port/priority buffer is used. If the packet is a multicast packet, then the global multicast pool is utilized for copies of the packet.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments.

DETAILED DESCRIPTION

Traditional Ethernet utilizes PAUSE frames for flow control over full-duplex links. An Ethernet station that is overwhelmed with packet traffic is able to send a PAUSE frame on its ports back to sending stations. The sending stations that receive the PAUSE frame will stop sending for a period of time (specified in the PAUSE frame). PAUSE frames are able to cause Head-Of-Line (HOL) blocking in a network as it does not differentiate between different flows—it acts only at the link level.

The IEEE 802.1Qbb standard specifies Priority Flow Control (PFC) for Ethernet, which allows for up to 8 priority levels of Ethernet traffic. The priority is typically placed in a 3-bit field in the packet's VLAN header. With the introduction of PFC, it is possible to differentiate classes of Ethernet traffic to prevent HOL blocking in the network, as flow control will only be sent back to the sender when the buffering available for a particular flow control channel is consumed beyond a specified amount. Traffic on other flow control channels is unaffected.

A switch includes flow control mechanisms. These flow control mechanisms are used to ensure that there is no HOL blocking when using PFC and to reduce the amount of packet buffer for the supported use cases. Given sufficient packet memory, PFC alone is sufficient to ensure that there is no HOL blocking. However, in order to reduce the amount of packet memory while simultaneously ensuring line rate performance in the non-congested case, other mechanisms are introduced to achieve these goals.

A large number of sending ports and channels substantially increases the amount of buffering required by the network switch, which is costly in chip die area. In general, the amount of buffering for a PFC channel is determined by the following: buffering for the maximum PFC reaction time from receiver back to sender which is typically in the range of 2.5-3 packets of Maximum Transmission Unit (MTU) size, depending on the link speed and flow control response latency; buffering at the receiver required to keep traffic flowing at line rate in the non-congested case which is approximately: 'latency through device*port rate,' typically this might be a few MTUs. The amount of buffering usually scales linearly with the number of sending ports and/or priorities (also referred to as ports/priorities) supported.

Software flow control is a method of flow control used in computer data links. Flow control uses special codes, transmitted in-band, over the primary communications channel between a receiver and a sender. These codes are generally referred to as Xon and Xoff (from "transmit on" and "transmit off," respectively). There are many ways of implementing Xon-Xoff including, but not limited to a messaging mechanism which sends messages indicating Xon or Xoff from the receiver and the sender, a continuous sending mechanism (e.g., continuously sending Xon until a buffer is full or a threshold is reached, at which point Xoff is continuously sent) or writing the current Xon-Xoff state to a memory which is able to be read by the sender. The determination of when to send or indicate Xon or Xoff is able to be based on a single threshold or multiple thresholds based on any number of factors such as the amount of space remaining in one or more of the buffers.

The transfer of packet data along a path capable of receiving and responding to flow control back pressure utilizes sufficient allocation of receiver buffer space to cover the Xon and Xoff (back pressure de-asserted and asserted) round trip time delays to prevent buffer overflow or a decrease in throughput performance. Assertion of back pressure is a control operation where data flow is suppressed or stopped, and de-assertion of back pressure is a control operation where the data flow is restored from a suppressed state. The buffering space increases as the data rate (bandwidth) or back pressure reaction latency increases. The assertion of back pressure stops packet transmission on a packet boundary. To prevent HOL blocking along a packet path, the buffer typically is sized for at least 2.5 packets of maximum transmission size (MTU-sized packets) bytes. For the case of multiple senders, allocating a minimum of 2.5 to 3 MTUs per sender allows the non-back pressured senders to not decrease performance when another sender is back pressured.

In addition to the Xon-Xoff implementation, a credit-controlled implementation is also described herein, where data transmission is blocked at the sender based on available transmission credits.

As the number of senders increases, the total buffering for packet storage begins to consume a significant amount of chip area. Previous implementations of utilizing a shared buffer pool have their own shortcomings. A storage scheme is described herein that limits the total buffering while allowing packet data to be received from all the senders while still respecting the Xon-Xoff back pressure requirements to prevent overflow. A decrease in packet throughput and bandwidth during periods of high packet traffic congestion is an allowable tradeoff for requiring less chip area by using a smaller buffer. However, full line rate is supported during non-congested cases.

The method described herein allows a smaller packet memory, but one which utilizes a more complex management scheme by separating the packet memory into different pools or buffer spaces. The method is to assign quantities of buffer storage to either belong to a shared pool or a dedicated buffer space (or per-sender pool), and to account for arriving packet data as belonging to either the shared pool or its dedicated buffer space. Each dedicated buffer space is associated with a single shared pool, with a shared pool capable of being associated with multiple dedicated buffer spaces.

Figure 1:
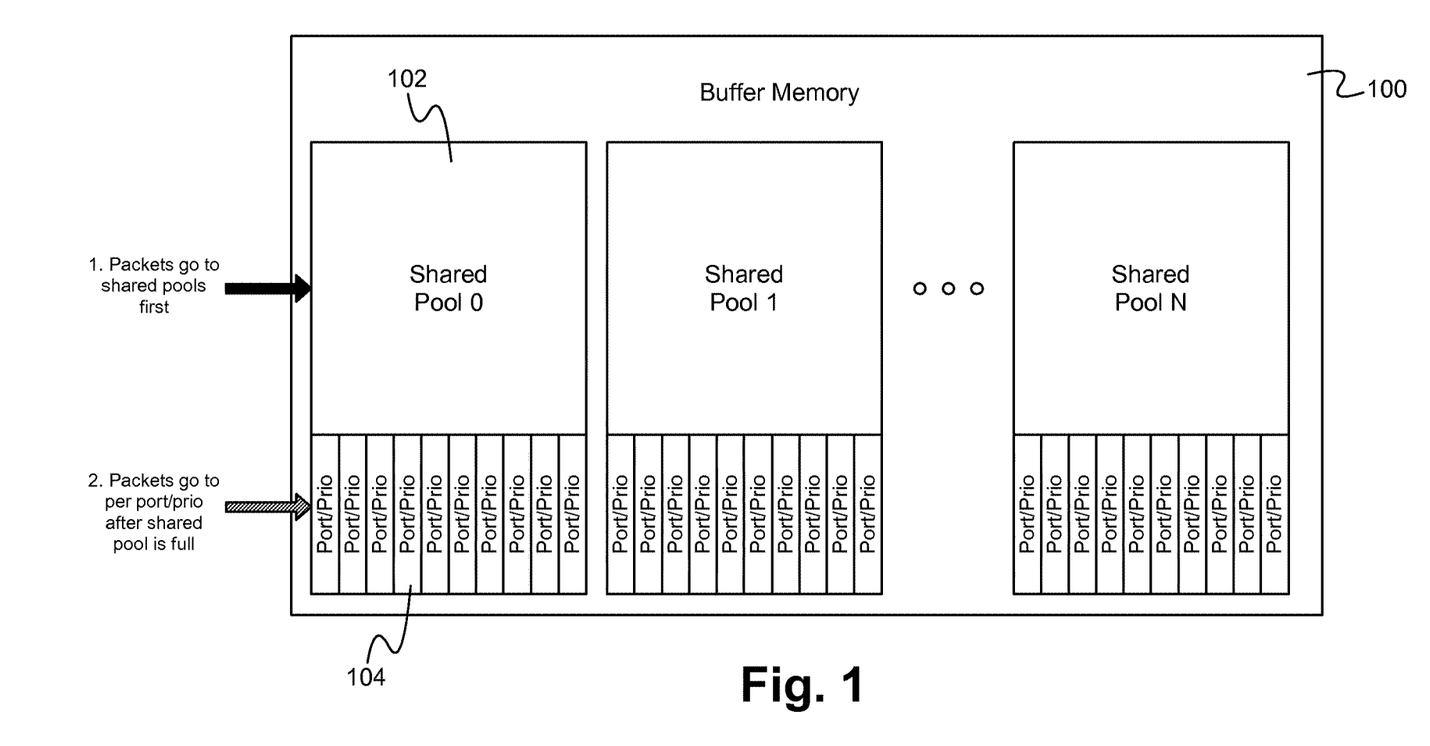
FIG. 1 illustrates a block diagram of a buffer memory according to some embodiments.

FIG. 1 illustrates a block diagram of a buffer memory according to some embodiments. The buffer memory 100 includes shared pools 0 . . . N 102 and dedicated buffer spaces 104 (also referred to as port/priority spaces or per-sender pools). Any number of shared pools 102 is able to be utilized, and for each shared pool, one or more dedicated buffer spaces 104 is able to be utilized. Although the shared pools 102 are shown as the same size, each shared pool is able to be any size. For example, all of the shared pools are able to be the same size, all of the shared pools are able to be different sizes, or some of the shared pools are able to be the same size and others are different sizes. In some embodiments, the sizes of the shared pools are able to be dynamically modified. Although the dedicated buffer spaces 104 are shown as the same size, each dedicated buffer space 104 is able to be any size. For example, all of the dedicated buffer spaces 104 are able to be the same size, all of the dedicated buffer spaces 104 are able to be different sizes, or some of the dedicated buffer spaces 104 are able to be the same size and others are different sizes. Furthering the example, if Port 1 is frequently utilized, it may be allocated a larger dedicated buffer space than Port 5 which is not utilized often. A higher priority dedicated buffer space may be larger than a lower priority dedicated buffer space. In some embodiments, the sizes of the dedicated buffer spaces are able to be dynamically modified. For example, as more senders couple to the switch, more dedicated buffer spaces 104 are added or the sizes of the dedicated buffer spaces 104 are modified. In some embodiments, each shared pool 102 is larger, smaller, or the same size as its associated dedicated buffer space(s) 104. Any appropriate size of either the shared pools 102 or the dedicated buffer spaces 104 is possible, from 0 bytes to very large, depending on the implementation.

The buffer memory 100 may be divided among multiple shared pools 102 and their associated dedicated buffers spaces 104 or per-sender pools. In such a configuration, the bytes of an arriving packet would be counted against the shared pool 102 to which the packet's sender is associated.

In some embodiments, at a minimum, each dedicated buffer space 104 includes 2+ MTUs worth of buffering to support the round trip flow control reaction time. However, this amount of buffering may cause the PFC channel to constantly get back pressured as soon as any data is received on the channel, resulting in poor throughput. The switch implementation described herein implements a shared pool of buffer accounting to allow line rate traffic in the typical uncongested case.

The operation of the switch implementation includes several steps. Each dedicated buffer space 104 is allocated for each packet source to sync packet data during the flow control Xoff back pressure reaction time. The shared pool 102 of buffer space is also allocated. In some embodiments, the buffer space allocated may correlate with the number of senders associated with the shared pool 102 or the overall bandwidth that would be directed towards the pool. Other allocation schemes are possible as well. Arriving packet data bytes are counted against the shared pool 102 in an accounting scheme first until the shared pool 102 is exhausted. During periods without high levels of packet traffic congestion, typically all packets will go to the shared pool 102 and be sent out in time to release the buffer space back to the shared pool 102 such that only shared pool buffer space is used. Once the shared pool 102 is exhausted, arriving packet data bytes are counted against a dedicated buffer space 104 (or per-sender pool) based on the port from which the packet was received.

An arriving packet's bytes are counted against only one pool. If not enough available space (e.g., bytes) exists in the shared pool 102, then all of the packet's bytes are counted against the dedicated buffer space 104.

The use of the shared pool 102 accomplishes several goals. The dedicated buffer space 104 is able to be minimally allocated to support the flow control reaction time. The shared pool 102 keeps traffic flowing at line rate unless high levels of congestion are encountered. The shared pool 102 potentially uses less buffer space than would be required by assigning resources to each dedicated buffer space 104 or sender port to ensure line rate. Even in the highly congested/blocked case, a sender port that is not blocked will still be able to send data, although the data rate may be lower.

Allocation of the buffer space to the dedicated buffer spaces 104 and shared pools 102 may be configurable by software.

The method and device described herein are usable for cases of flow control that are controlled by Xon-Xoff back pressure as well as credit-controlled back pressure where data transmission is blocked at the sender based on available transmission credits. The Xon-Xoff back pressure scheme is controlled internally within the switch device, while credit-controlled back pressure schemes utilize credits maintained at the sending device. Xon-Xoff back pressure is able to be calculated in any manner and implemented in any manner. For example, if an amount of available buffer space is below a threshold, then back pressure is activated to reduce the transmission rate or stop transmissions. The Xon-Xoff back pressure calculation is able to be based on the available buffer space and/or any other factors. Senders using packet-size based transmission credits (e.g. byte, buffer page) to control data flow are assigned a number of credits that reflects the allocated dedicated buffer space 104, ignoring the buffer space consumed by the associated shared pool 102. The sender only transmits a packet if enough credits exist to account for the entire packet. For example, if the sender only has 10 Kbytes of credits remaining, and the next packet to be sent is 12 Kbytes, the sender will have to wait until sufficient credits are returned before sending the 12-Kbyte packet. Transmission credits are decremented upon packet transmission: decrementing the appropriate number of credits once the decision has been made to send the packet or during packet transmission. For an arriving packet assigned to belong to the shared pool 102, transmission credits are immediately returned to the sender upon assignment of storage. The allocation and return of the credits to the sender needs to match the method of credit decrement used by the sender. For an arriving packet assigned to belong to a dedicated buffer space 104, the transmission credits are returned to the sender upon freeing of the dedicated buffer space 104 consumed by the packet.

When using Xon-Xoff back pressure, the credit management mechanism is wholly contained within logic that manages the buffer space. For the dedicated buffer space 104 or per-sender pools, credits are similarly consumed and returned as buffer space is allocated and freed, respectively, with shared pool credits being returned upon buffer space allocation. Generation of Xon-Xoff back pressure to the sender is based upon available credits in the associated dedicated buffer space 104. A message or other signal is sent to the sender to indicate that credits are available so that the sender may determine if packet transmission is allowed. As packets arrive in the associated dedicated buffer space 104, there are thresholds available as to when to assert Xon or Xoff. The thresholds may be configurable by software. In some embodiments, the thresholds account for the amount of time the Xon or Xoff message will take to be received at the sender. For example, if the threshold is not triggered until a dedicated buffer space 104 is full, another packet may be sent by the sender before an Xoff message is received at the sender. The Xoff threshold is set to ensure the Xoff message is able to be sent and received before the associated dedicated buffer space 104 capacity would be exceeded. In some embodiments, additional buffer space is provided to the dedicated buffer space 104 when using Xon-Xoff to account for the time delays of sending the Xon-Xoff messages to the sender.

In some embodiments, the switch is capable of utilizing the Xon-Xoff implementation and the credit-based implementation, both of which are forms of implementing PFC. For example, if a device has Xon-Xoff capabilities, then the switch utilizes the Xon-Xoff implementation for that device, and if a device does not have Xon-Xoff capabilities, then the switch utilizes the credit-based mechanism for that device. The switch is able to communicate with both types of devices at the same time.

Figure 2:
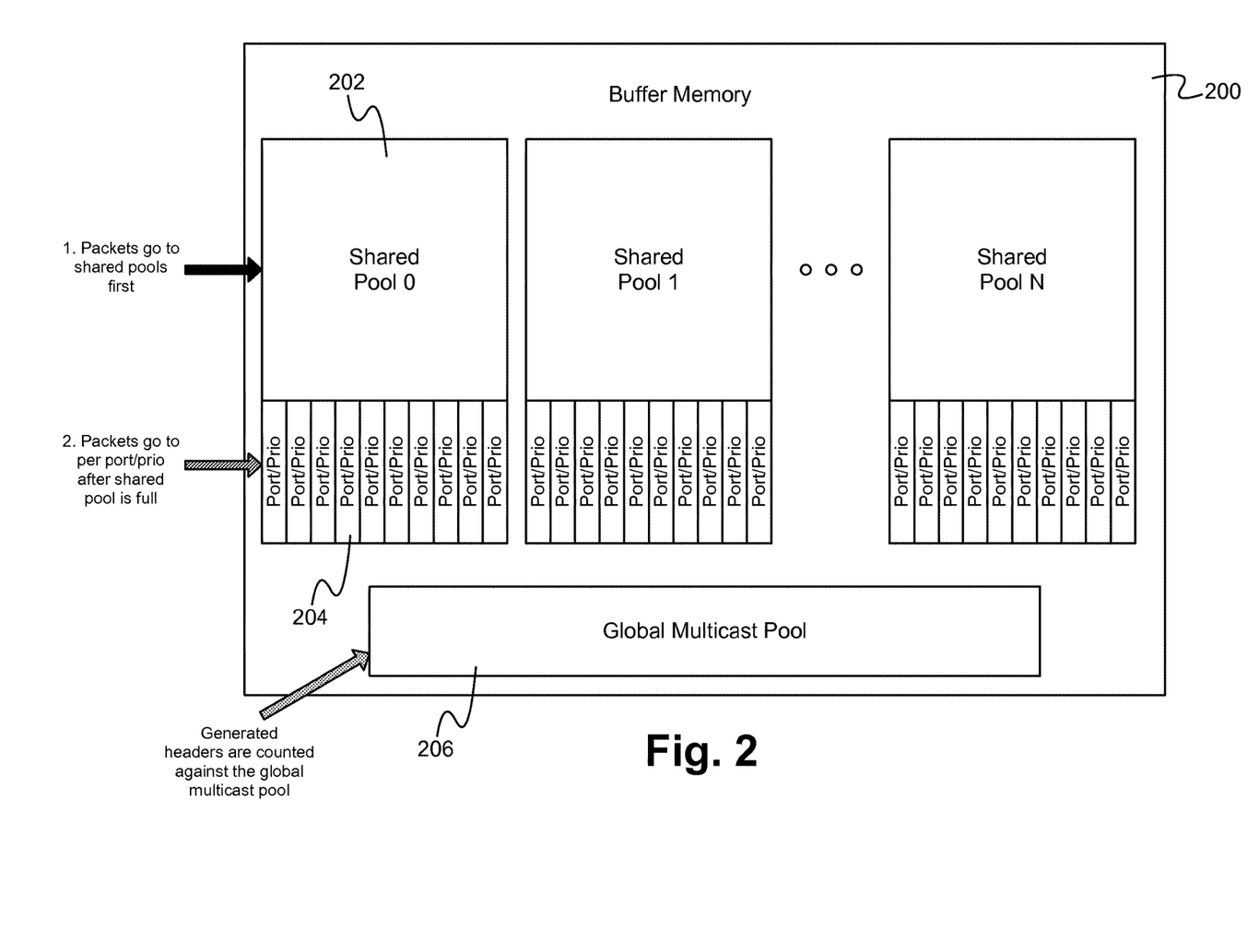
FIG. 2 illustrates a block diagram of a buffer memory including a global multicast pool according to some embodiments.

The method and device also support data that is locally-generated and stored in the buffer based on arriving packet data as is described further in FIG. 2.

FIG. 2 illustrates a block diagram of a buffer memory including a global multicast pool according to some embodiments. The buffer memory 200 includes shared pools 0 ... N 202 and dedicated buffer spaces 204 (also referred to as port/priority spaces or per-sender pools). Additionally, the buffer memory 200 includes a global multicast pool 206 for storing multi-copy packets. Multi-copy packets are not those packets which arrive and generate copies but are the actual generated copies.

PFC is supported on all switch ports. In order to support truly lossless operation, a switch counts the buffer usage of unicast packets, dropped packets, as well as multi-copy packets. For example, counting the buffer usage includes maintaining a number or an amount of buffer space storing packets including copies of headers of the packets, and the number or amount is able to be compared with one or more thresholds to implement schemes such as back pressure methods. Furthering the example, a table or other data structure is able to count buffer usage for each specific pool or space such as the shared pools 202, the dedicated buffer spaces 204 and the global multicast pool 206.

Data may be generated based on information received from a packet or packets which arrive from a single sender. When using the Xon-Xoff back pressure method the generated data would be identified as belonging to the same sender port as the packet(s) from which the generated data was derived or a different location. The quantity of generated data counts against the sender's shared pool buffer 202 (if sufficient space is available) or sender's dedicated buffer space 204 and impacts the Xon-Xoff back pressure calculation until the buffer space storing the generated data is freed.

When using the transmission credit method of back pressure, the quantity of generated data is counted against the sender's shared pool 202 or dedicated buffer space 204 unless the sender is notified about the extra data that is generated and stored so that its transmission credits may be updated. For simplicity, assuming no mechanism is used to notify the sender of generated data, a global multicast pool 206 (or generated data pool) is allocated outside the shared pool 202 using the shared buffer. All data that is generated based on a packet(s) from a sender port using transmission credits is counted against the global multicast pool 206. When the global multicast pool 206 is exhausted, tail dropping occurs to prevent any additional generated data until space is again available in the generated data pool due to freeing of buffer space containing generated data. No HOL blocking due to the inability to create generated data is allowed.

To support the counting of multi-copy packets, generated copies are correctly identified, each additional header generated is counted, and the body and the original packet header are counted only once. To limit buffer space utilization, a multi-copy packet may include a generated header and a hardware pointer to buffer space where the packet body is stored, requiring additional storage only the generated header. In some embodiments, the packet copy may be stored in its entirety in the buffer memory, and in some embodiments, only the complete modified packet header copy is stored in the buffer memory with a pointer to the packet data. Similarly, truly identical copies of a packet should only be counted one time. When a packet is copied, all copies of the packet are marked as multicast so the packet is able to be properly counted for PFC. A single copy and only a single copy out of the N copies generated is marked as a 'count body' token so that the packet body for PFC is accounted for. Additionally, at least one generated copy header is produced, of which one and only one header is marked as a 'count header' token so that the packet header for PFC is accounted.

Packets are assigned to a buffer pool and different actions are taken depending on the pool assigned. Packets are assigned to a pool regardless of whether the packet is to be forwarded or dropped. If there is space in the shared pool 202, the packet is assigned to the shared pool 202. If the shared pool 202 is not full or if the shared pool 202 has available space that is greater than or equal to the size of the packet, the packet is counted against its shared buffer space 202, and if the shared pool 202 is full or if the shared pool 202 has available space that is less than the size of the packet, the packet is counted against the dedicated buffer space 204. If the dedicated per-port/priority Xoff threshold is reached, flow control is asserted for that port/priority. Dropped packets free the buffer memory. The pool that a page belongs to is also tracked. When packet buffer memory is freed, pool identifier information is analyzed so that per-pool counters are able to be adjusted appropriately. If applicable, transmission credits are returned to the sender after the counters are decremented. Buffer memory pages are freed when the packet data is no longer needed, either due to packet drops, or after transmission. Packet drop requests are received and the consumed buffer is assigned to the appropriate pool. When pages are freed, the number of pages and pool information is tracked for PFC accounting. When a set of pages belonging to a packet are freed, the header page may belong to a different pool than the body page(s). Credit returns may be consolidated prior to sending back to the packet's sender.

A major source of switch buffer allocation is the per PFC channel buffering used to absorb traffic between the time when flow control is asserted and when the sender actually stops sending data (2-3 MTUs).

An opportunity may exist to use a more efficient flow control method to reduce the per-PFC channel buffering requirements down to 1 MTU only. Each channel from the sender is able to be allocated channel credits. Once the channel credits are consumed, the sender stops sending data on that channel.

In order to implement the same shared pool concept with the transmitter credits, the switch sends the channel credits back to the transmitter immediately if the packet is allocated to the shared pool. Only when the shared pool is full will the switch wait until the packet is fully processed and the consumed buffer space released before sending credits back to the transmitter. The switch and transmitter are programmed in a consistent manner, and credits are only supported on the ports receiving data from the transmitter.

The switch supports both PFC and credit-based flow control on the ports that receive data from the transmitter. Other ports do not implement any credit-based flow control.

A complication in using credits between the transmitter and the switch comes with multi-copy packets. When the transmitter sends a packet to the switch, the transmitter treats the packet as a unicast packet, not aware if the packet will be interpreted as a multi-copy packet at the switch. However, after receiving the packet, the switch may make multiple copies of the packet. Identical copies of the entire packet incur no additional buffer space. However, copies of the packet for which the header is different than the original copy cause the allocation of a new header buffer memory page (which is unaccounted for by the transmitter). When the switch processes multi-copy packets, including the assignment of generated packet header data to the global multicast pool as data is generated, the following is performed. A global multicast pool 206 is allocated for the additional buffer consumed. When the global multicast pool 206 is exhausted, further copies are prevented from being made. When credits are returned to the transmitter, only the credits which the transmitter actually decremented are returned.

The switch buffer allocation is allocated slightly differently to account for the global multicast pool 206 as shown in FIG. 2.

Transmitter Example

The following is only an example and does not limit the invention in any way.

Each flow control channel in use has the initial number of credits programmed by software. 1 credit=1 page of switch buffer space (256 bytes). When a packet is sent from the transmitter to the switch, the number of credits is decremented, including: rounding up the number of page credits consumed to account for the packet size and the programmable header size; one packet memory page needs to be accounted for the programmed header size, and the remaining packet body bytes are used to calculate an integer number of credits to decrement. The decrementing of credits takes into account the following characteristics of the switch:

1) uses a page size of 256 bytes,
2) has a programmable header size up to 256 bytes,
3) puts the header and body of the packet into different pages (e.g., at 128 byte header size, a 129 byte packet consumes 2 pages (512 bytes)),
4) when the switch releases credits back to the transmitter, the credits must be replenished back to the appropriate flow control channel.

Figure 3:
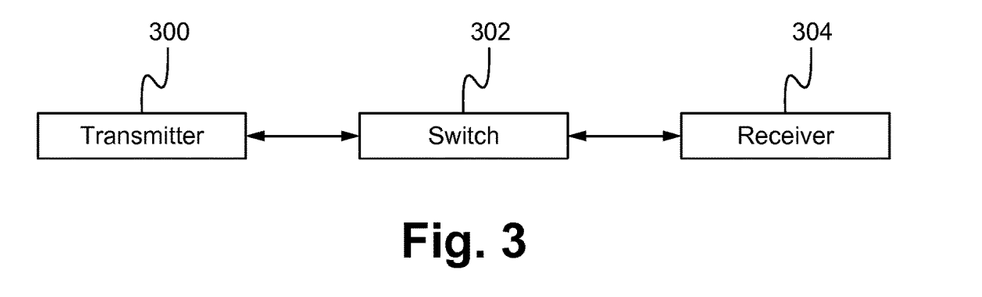
FIG. 3 illustrates a block diagram of a network of devices configured for implementing the buffer management method according to some embodiments.

FIG. 3 illustrates a block diagram of a network of devices configured for implementing the buffer management method according to some embodiments. A transmitter 300 (or transmitting device) is able to communicate with a receiver 304 (or receiving device) through a switch 302 which is configured with the buffer management and also contains the described buffer memory. The transmitter 300 sends data to the receiver 304 which receives the data. The data goes from the transmitter 300 to the switch 302 before being sent to the receiver 304. The switch 302 manages the incoming data in a way that reduces the amount of memory used at the switch 302. As described herein, processes are implemented to ensure the transmitter 300 sends the data appropriately and efficiently. The processes are able to be implemented using credits which the transmitter 300 is able to account for or the processes are implemented internally at the switch 302. In some embodiments, the transmitter 300, the switch 302 and the receiver 304 are in the same device. In some embodiments, the transmitter 300, the switch 302 and the receiver 304 are on the same physical hardware such as a microchip. In some embodiments, the transmitter 300, the switch 302 and the receiver 304 are in the different, separate devices.

Figure 4:
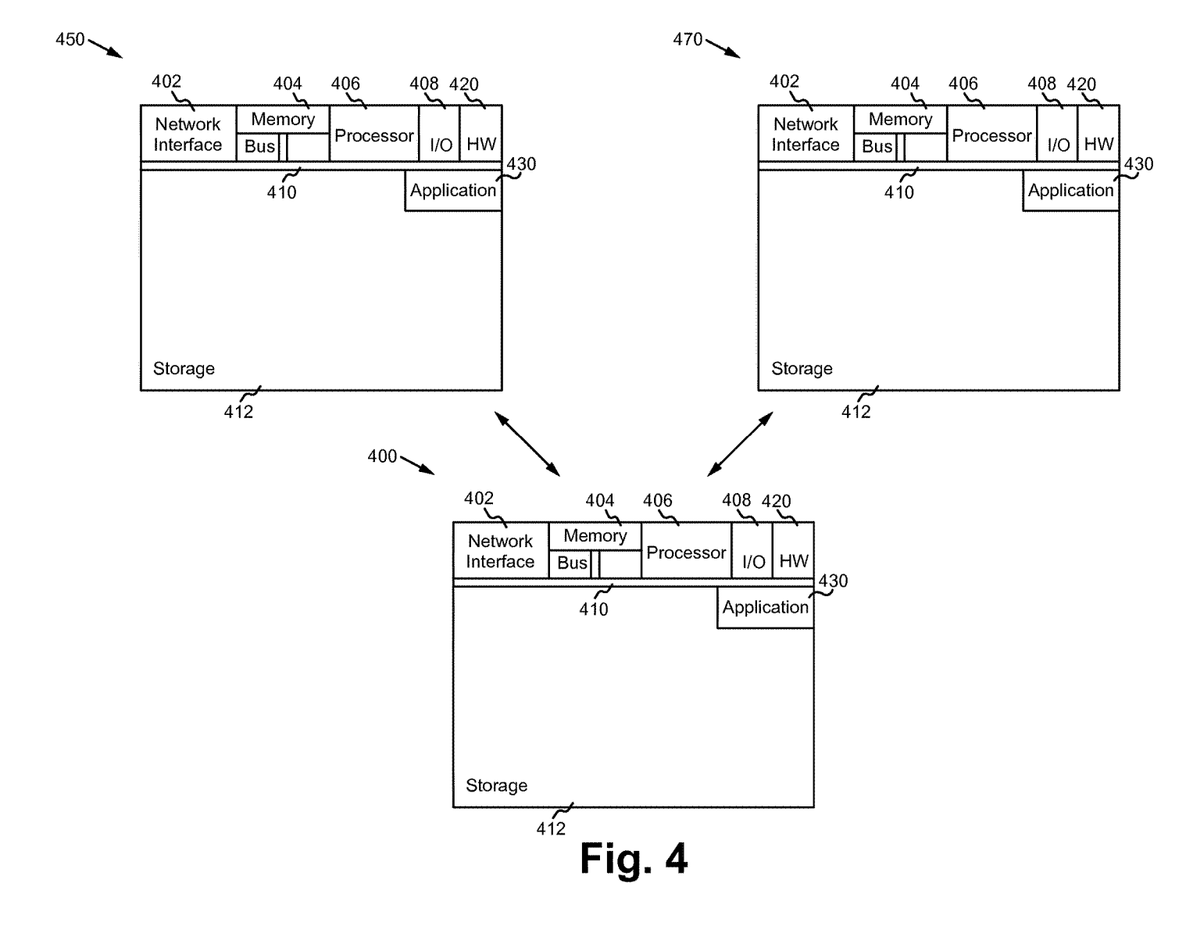
FIG. 4 illustrates a block diagram of exemplary computing devices configured to implement the buffer management method according to some embodiments.

FIG. 4 illustrates a block diagram of exemplary computing devices configured to implement the buffer management method according to some embodiments. A computing device 400 is able to be used to acquire, store, compute, process, communicate, receive, send, and/or display information such as data packets. In general, a hardware structure suitable for implementing the computing device 400 includes a network interface 402, a memory 404, a processor 406, I/O device(s) 408, a bus 410 and a storage device 412. The choice of processor(s) is not critical as long as suitable processor(s) with sufficient speed are chosen. The memory 404 is able to be any conventional computer memory known in the art. The storage device 412 is able to include memory, a hard drive, CDROM, CDRW, DVD, DVDRW, High Definition disc/drive, ultra-HD drive, flash memory card or any other storage device. The computing device 400 is able to include one or more network interfaces 402. An example of a network interface includes a network interface controller or a network card connected to an Ethernet or other type of Local Area Network (LAN). The I/O device(s) 408 are able to include one or more of the following: keyboard, mouse, monitor, screen, printer, modem, touchscreen, button interface and other devices. Buffer management application(s) 430 used to perform the buffer management method may be stored in the storage device 412 and memory 404 and processed as applications are typically processed. More or fewer components shown in FIG. 4 are able to be included in the computing device 400. In some embodiments, buffer management hardware 420 is included. Although the computing device 400 in FIG. 4 includes applications 430 and hardware 420 for the buffer management method, the buffer management method is able to be implemented on a computing device in hardware, firmware, software or any combination thereof. For example, in some embodiments, the buffer management applications 430 are programmed in a memory and executed using a processor. In another example, in some embodiments, the buffer management hardware 420 is programmed hardware logic including gates specifically designed to implement the buffer management method.

In some embodiments, the buffer management application(s) 430 include several applications and/or modules. In some embodiments, modules include one or more sub-modules as well. In some embodiments, fewer or additional modules are able to be included.

Examples of suitable computing devices include a network switch, a router, a hub, any other networking equipment and any other computing devices.

The computing device 400 is able to couple to a transmitter device 450 and a receiver device 470. The transmitter device 450 and the receiver device 470 may include the same or similar hardware and software components as the computing device 400 or different components. The transmitter device 450 is able to send data through the computing device 400 to the receiver device 470.

Figure 5:
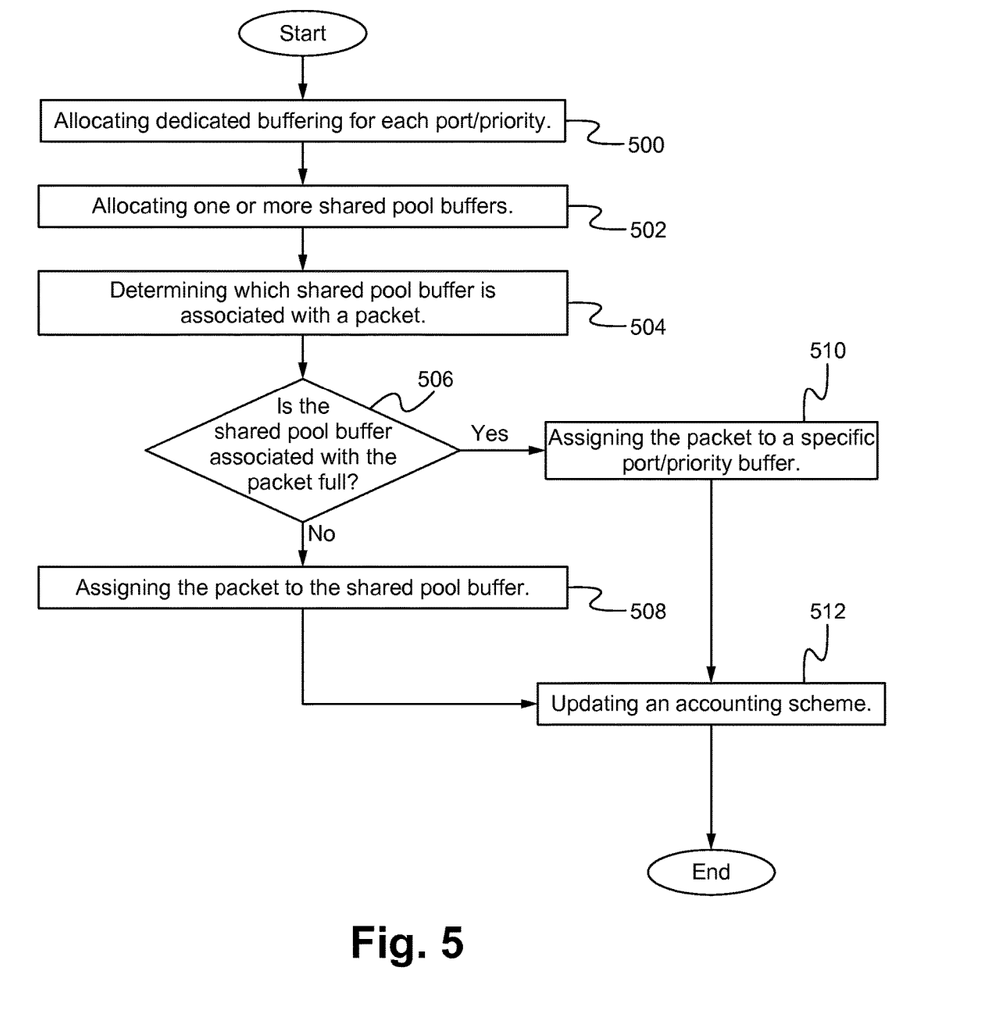
FIG. 5 illustrates a flowchart of a method of implementing buffer management according to some embodiments.

FIG. 5 illustrates a flowchart of a method of implementing buffer management according to some embodiments. In the step 500, dedicated buffering is allocated for each port/priority. In the step 502, one or more shared pool buffers are allocated. The dedicated buffering is associated with a shared pool buffer. In the step 504, it is determined which shared pool is associated with a received packet. The associated shared pool is able to be determined using a lookup table (e.g., lookup table connects a sender with an associated shared pool) or any other method of determining which shared pool is associated with a packet. In the step 506, it is determined if the associated shared pool buffer is full or if the shared buffer space has available space. If the associated shared pool buffer is not full or has available space greater than or equal to the size of the received packet, then the received packet is assigned to the associated shared pool buffer, in the step 508. If the associated shared pool buffer is full or if the shared buffer space has available space that is less than the size of the packet, then the received packet is assigned to a specific port/priority buffer, in the step 510. In the step 512, an accounting scheme is updated based on assigning the packet. In some embodiments, credit management or other transfer management implementations are used to ensure packets are efficiently transferred. In some embodiments, fewer or additional steps are implemented. In some embodiments, the order of the steps is modified.

Figure 6:
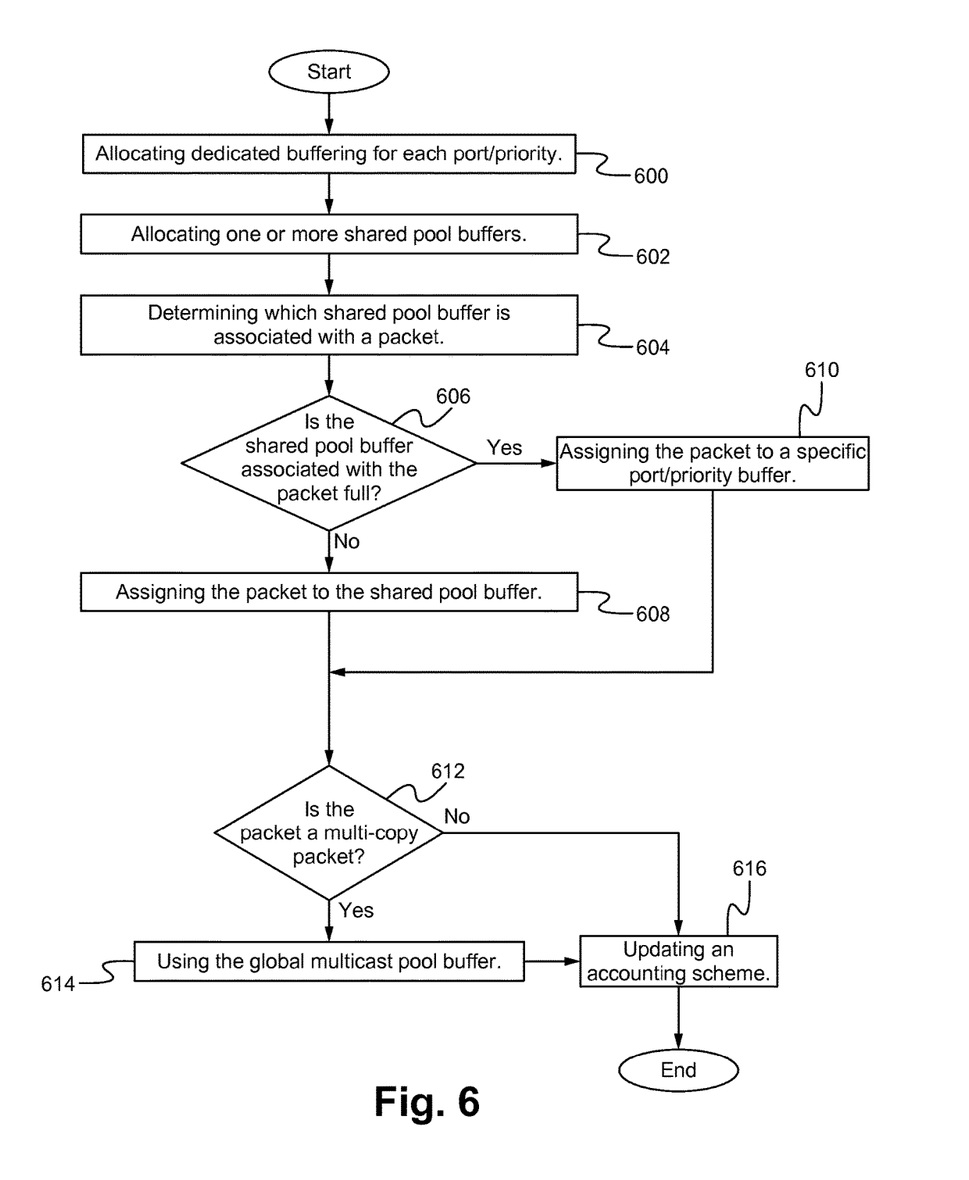
FIG. 6 illustrates a flowchart of a method of implementing buffer management according to some embodiments.

FIG. 6 illustrates a flowchart of a method of implementing buffer management according to some embodiments. In the step 600, dedicated buffering is allocated for each port/priority. In the step 602, one or more shared pool buffers are allocated. The dedicated buffering is associated with a shared pool buffer. In some embodiments, a global multicast pool is also allocated. In the step 604, it is determined which shared pool buffer is associated with a received packet. The associated shared pool is able to be determined using a lookup table (e.g., lookup table connects a sender with an associated shared pool) or any other method of determining which shared pool is associated with a packet. In the step 606, it is determined if the associated shared pool buffer is full or if the shared buffer space has available space. If the associated shared pool buffer is not full or has available space greater than or equal to the size of the received packet, then the received packet is assigned to the associated shared pool buffer, in the step 608. If the associated shared pool buffer is full or if the shared buffer space has available space that is less than the size of the packet, then the received packet is assigned to a specific port/priority buffer, in the step 610. In the step 612, it is determined if the packet is a multi-copy packet. If the packet is a multi-copy packet, then the global multicast pool is utilized for the generated copies of the packet in the step 614. In the step 616, an accounting scheme is updated based on assigning the packet. In some embodiments, credit management or other transfer management implementations are implemented to ensure packets are efficiently transferred. In some embodiments, fewer or additional steps are implemented. In some embodiments, the order of the steps is modified.

To utilize the buffer management method, a switch or other device is configured to implement the buffer management method including allocating dedicated buffer space, shared buffer space and, in some embodiments, a global multicast pool buffer. The switch is then able to automatically manage the data and the buffer space by implementing the methods described herein. When utilized accordingly, a network of devices is able to efficiently transfer data while reducing the amount of storage space used by a buffer.

In operation, the buffer management method improves buffering technology by utilizing a smaller space of memory by intelligently managing the buffer space. The goals of the switch implementation described herein include: supporting PFC channels/ports and flow control channels to the transmitter, supporting full line rate traffic on all priorities in the non-congested case, ensuring there is no HOL blocking on a priority due to other priorities, performance degradation is acceptable when there is high congestion or blocking on other channels, and supporting the previous items without a full buffer allocation to each PFC channel of (flow control reaction time+line rate buffer). The buffer management method also includes a multi-copy packet memory pool to handle generated data. Previous PFC schemes did not count multi-copy packets at all, so the use of buffer space for multi-copy packets could potentially consume the expected amount of buffering available and cause tail dropping due to lack of buffer space. The buffer management method described herein ensures that although multi-copy packets may still be dropped, the amount of buffering that the multi-copy packets use is capped to prevent them from possibly affecting the buffer space allocated elsewhere. Allocating buffer space explicitly for multicast packets is an advantage over prior implementations that would otherwise allocate space from the dedicated sender pool.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

We claim:

1. A method programmed in a non-transitory computer-readable medium of a device comprising:
    allocating dedicated buffer space based on a plurality of ports and priority;
    allocating shared buffer space thereby forming a plurality of shared buffer spaces, wherein each one of the shared buffer spaces is shared by a different set of two or more of the plurality of ports and each port of each of the sets is able to use any portion of the shared buffer space that the set that includes the port shares;
    receiving a packet;
    determining if the shared buffer space has available space that is greater than or equal to the size of the packet;
    if the shared buffer space has available space that is greater than or equal to the size of the packet, then assigning the packet to the shared buffer space;
    if the shared buffer space has available space that is less than the size of the packet, then assigning the packet to the dedicated buffer space;
    accounting for arriving packet data as assigned to the shared buffer space or the dedicated buffer space, wherein accounting for the arriving packet data utilizes an allocation of transmission credits for each port including incrementing or decrementing the transmission credits as the shared buffer space and the dedicated buffer space receives and transmits the packet data; and
    returning the transmission credits for the packet upon assignment of the packet to the shared buffer space.

2. The method of claim 1 wherein allocating the dedicated buffer space includes allocating one or more dedicated buffer spaces.

3. The method of claim 2 wherein each of the one or more dedicated buffer spaces is associated with one shared buffer space of the shared buffer spaces.

4. The method of claim 1 further comprising updating an accounting scheme based on the assignment of the packet.

5. The method of claim 4 wherein the allocation of the transmission credits is internal to the device or at a transmitting device.

6. The method of claim 4 further comprising returning the transmission credits for the packet assigned to the dedicated buffer space upon freeing of the dedicated buffer space consumed by the packet.

7. The method of claim 1 further comprising copying data based on the packet thereby forming copied data, wherein a quantity of the copied data is utilized in calculating an amount of utilized buffer space while the copied data is being stored, and further wherein the amount of utilized buffer space is compared with one or more thresholds to establish a transmission rate.

8. The method of claim 1 further comprising copying data based on the packet wherein a generated data pool is allocated outside the shared buffer space, and all data that is copied based on the packet from a sender port or priority using the transmission credits is counted against the generated data pool in an accounting of buffer space availability.

9. The method of claim 8 further comprising implementing a global multicast pool for storing a header of each of the copies of the packet, wherein the header is different than an original copy of the packet.

10. The method of claim 1 further comprising copying the packet to generate copied packets, generating headers of the copied packets, and allocating a global multicast pool, wherein the global multicast pool is configured for receiving the generated headers of the copied packets including counting the generated headers of the copied packets only against the global multicast pool in an accounting of buffer space availability.

11. The method of claim 1 further comprising, after the allocating of the shared buffer space and the dedicated buffer space establishes a ratio of the shared buffer space to the dedicated buffer space, dynamically adjusting the ratio based on a change in quantity of the plurality of ports.

12. The method of claim 1 further comprising changing a size of one of the dedicated buffer spaces allocated to at least one of the ports based on the priority of the at least one of the ports.

13. A method programmed in a non-transitory computer-readable medium of a device comprising:
    allocating dedicated buffer space based on ports and priority;
    allocating shared buffer space;
    receiving a packet;
    determining if the shared buffer space has available space that is greater than or equal to the size of the packet;
    if the shared buffer space has available space that is greater than or equal to the size of the packet, then assigning the packet to the shared buffer space;
    if the shared buffer space has available space that is less than the size of the packet, then assigning the packet to the dedicated buffer space; and
    when utilizing transmission credits to establish a transmission rate for a transmitting device, copying data based on the packet thereby forming copied data, wherein a quantity of the copied data is not counted against the dedicated buffer space or the shared buffer space in an accounting of buffer space availability unless the transmitting device is notified about the quantity of the copied data and an associated port and an associated priority so that the transmitting device's transmission credits are updated.

14. A device comprising:
    a non-transitory memory for storing an application, the application configured for:
        allocating dedicated buffer space based on a plurality of ports and priority;
        allocating shared buffer space thereby forming a plurality of shared buffer spaces, wherein each one of the shared buffer spaces is shared by a different set of two or more of the plurality of ports and each port of each of the sets is able to use any portion of the shared buffer space that the set that includes the port shares;
        receiving a packet;

accounting for arriving packet data as assigned to the shared buffer space or the dedicated buffer space, wherein accounting for the arriving packet data utilizes an allocation of transmission credits for each port including incrementing or decrementing the transmission credits as the shared buffer space and the dedicated buffer space receives and transmits the packet data; and returning the transmission credits for the packet upon assignment of the packet to the shared buffer space; and a processing component coupled to the memory, the processing component configured for processing the application.

15. The device of claim 14 wherein the allocating of the dedicated buffer space includes allocating one or more dedicated buffer spaces.

16. The device of claim 15 wherein each of the one or more dedicated buffer spaces is associated with one shared buffer space of the shared buffer spaces.

17. The device of claim 14 wherein the application is further configured for updating an accounting scheme based on the assignment the packet.

18. The device of claim 17 wherein the allocation of the transmission credits is internal to the device or at a transmitting device.

19. The device of claim 17 wherein the application is further configured for returning the transmission credits for the packet assigned to the dedicated buffer space upon freeing of the dedicated buffer space consumed by the packet.

20. The device of claim 14 wherein the application is further configured for copying data based on the packet thereby forming copied data, wherein a quantity of the copied data is utilized in calculating an amount of utilized buffer space while the copied data is being stored, and further wherein the amount of utilized buffer space is compared with one or more thresholds to establish a transmission rate.

21. The device of claim 14 wherein the application is further configured for copying data based on the packet wherein a generated data pool is allocated outside the shared buffer space, and all data that is copied based on the packet from a sender port or priority using the transmission credits is counted against the generated data pool in an accounting of buffer space availability.

22. The device of claim 21 wherein the application is further configured for implementing a global multicast pool for storing a header of each of the copies of the packet, wherein the header is different than an original copy of the packet.

23. The device of claim 14 wherein the application is further configured for copying the packet to generate copied packets, generating headers of the copied packets, and allocating a global multicast pool, wherein the global multicast pool is configured for receiving the generated headers of the copied packets including counting the generated headers of the copied packets only against the global multicast pool in an accounting of buffer space availability.

24. The device of claim 14 wherein the application is configured for:
determining if the shared buffer space has available space that is greater than or equal to the size of the packet;
if the shared buffer space has available space that is greater than or equal to the size of the packet, then assigning the packet to the shared buffer space; and
if the shared buffer space has available space that is less than the size of the packet, then assigning the packet to the dedicated buffer space.

25. A device comprising:
a non-transitory memory for storing an application, the application configured for:
allocating dedicated buffer space based on ports and priority;
allocating shared buffer space;
receiving a packet;
determining if the shared buffer space has available space that is greater than or equal to the size of the packet;
if the shared buffer space has available space that is greater than or equal to the size of the packet, then assigning the packet to the shared buffer space; and
if the shared buffer space has available space that is less than the size of the packet, then assigning the packet to the dedicated buffer space; and
a processing component coupled to the memory, the processing component configured for processing the application, wherein when utilizing transmission credits to establish a transmission rate for a transmitting device, the application is further configured for copying data based on the packet thereby forming copied data, wherein a quantity of the copied data is not counted against the dedicated buffer space or the shared buffer space in an accounting of buffer space availability unless the transmitting device is notified about the quantity of the copied data and an associated port and an associated priority so that the transmitting device's transmission credits are updated.

26. A non-transitory computer readable medium configured for storing instructions, that when executed by a computing device, cause the computing device to perform a method comprising:
allocating dedicated buffer space based on a plurality of ports and priority;
allocating shared buffer space thereby forming a plurality of shared buffer spaces, wherein each one of the shared buffer spaces is shared by a different set of two or more of the plurality of ports and each port of each of the sets is able to use any portion of the shared buffer space that the set that includes the port shares;
receiving a packet;
accounting for arriving packet data as assigned to the shared buffer space or the dedicated buffer space, wherein accounting for the arriving packet data utilizes an allocation of transmission credits for each port including incrementing or decrementing the transmission credits as the shared buffer space and the dedicated buffer space receives and transmits the packet data; and
returning the transmission credits for the packet upon assignment of the packet to the shared buffer space.

27. The non-transitory computer readable medium of claim 26 wherein allocating the dedicated buffer space includes allocating one or more dedicated buffer spaces.

28. The non-transitory computer readable medium of claim 27 wherein each of the one or more dedicated buffer spaces is associated with one shared buffer space of the shared buffer spaces.

29. The non-transitory computer readable medium of claim 26 wherein the method further comprises updating an accounting scheme based on the assignment of the packet.

30. The non-transitory computer readable medium of claim 29 wherein the allocation of the transmission credits is internal to the device or at a transmitting device.

31. The non-transitory computer readable medium of claim 29 wherein the method further comprises returning the transmission credits for the packet assigned to the dedicated buffer space upon freeing of the dedicated buffer space consumed by the packet.

32. The non-transitory computer readable medium of claim 26 wherein when utilizing the transmission credits to establish a transmission rate for a transmitting device, the method further comprises copying data based on the packet thereby forming copied data, wherein a quantity of the copied data is not counted against the dedicated buffer space or the shared buffer space in an accounting of buffer space availability unless the transmitting device is notified about the quantity of the copied data and an associated port and an associated priority so that the transmitting device's transmission credits are updated.

33. The non-transitory computer readable medium of claim 26 wherein the method further comprises copying data based on the packet wherein a generated data pool is allocated outside the shared buffer space, and all data that is copied based on the packet from a sender port or priority using the transmission credits is counted against the generated data pool in an accounting of buffer space availability.

34. The non-transitory computer readable medium of claim 33 wherein the method further comprises implementing a global multicast pool for storing a header of each of the copies of the packet, wherein the header is different than an original copy of the packet.

35. The non-transitory computer readable medium of claim 26 wherein the method further comprises copying the packet to generate copied packets, generating headers of the copied packets, and allocating a global multicast pool, wherein the global multicast pool is configured for receiving the generated headers of the copied packets including counting the generated headers of the copied packets only against the global multicast pool in an accounting of buffer space availability.

36. The non-transitory computer readable medium of claim 26
wherein the method further comprises:
determining if the shared buffer space has available space that is greater than or equal to the size of the packet;
if the shared buffer space has available space that is greater than or equal to the size of the packet, then assigning the packet to the shared buffer space; and
if the shared buffer space has available space that is less than the size of the packet, then assigning the packet to the dedicated buffer space.

37. A non-transitory computer readable medium configured for storing instructions, that when executed by a computing device, cause the computing device to perform a method comprising:
allocating dedicated buffer space based on ports and priority;
allocating shared buffer space;
receiving a packet;
determining if the shared buffer space has available space that is greater than or equal to the size of the packet;
if the shared buffer space has available space that is greater than or equal to the size of the packet, then assigning the packet to the shared buffer space; and
if the shared buffer space has available space that is less than the size of the packet, then assigning the packet to the dedicated buffer space, wherein the method further comprises copying data based on the packet thereby forming copied data, wherein a quantity of the copied data is utilized in calculating an amount of utilized buffer space while the copied data is being stored, and further wherein the amount of utilized buffer space is compared with one or more thresholds to establish a transmission rate.

38. A device for receiving a packet comprising:
a non-transitory memory for:
allocating a dedicated buffer space based on a plurality of ports and priority;
allocating a shared buffer space thereby forming a plurality of shared buffer spaces, wherein each one of the shared buffer spaces is shared by a different set of two or more of the plurality of ports and each port of each of the sets is able to use any portion of the shared buffer space that the set that includes the port shares;
accounting for arriving packet data as assigned to the shared buffer space or the dedicated buffer space, wherein accounting for the arriving packet data utilizes an allocation of transmission credits for each port including incrementing or decrementing the transmission credits as the shared buffer space and the dedicated buffer space receives and transmits the packet data; and
returning the transmission credits for the packet upon assignment of the packet to the shared buffer space; and
a processing component coupled to the memory, the processing component configured for processing the packet.

39. The device of claim 38 wherein the allocating of the dedicated buffer space includes allocating one or more dedicated buffer spaces.

40. The device of claim 39 wherein each of the one or more dedicated buffer spaces is associated with one shared buffer space of the shared buffer spaces.

41. The device of claim 38 wherein the non-transitory memory is further configured for updating an accounting scheme based on the assignment of the packet.

42. The device of claim 41 wherein the allocation of the transmission credits is internal to the device or at a transmitting device.

43. The device of claim 41 wherein the non-transitory memory is further configured for returning the transmission credits for the packet assigned to the dedicated buffer space upon freeing of the dedicated buffer space consumed by the packet.

44. The device of claim 38 wherein when utilizing the transmission credits to establish a transmission rate for a transmitting device, the non-transitory memory is further configured for copying data based on the packet thereby forming copied data, wherein a quantity of the copied data is not counted against the dedicated buffer space or the shared buffer space in an accounting of buffer space availability unless the transmitting device is notified about the quantity of the copied data and an associated port and an associated priority so that the transmission device's transmission credits are updated.

45. The device of claim 38 wherein the non-transitory memory is further configured for copying data based on the packet wherein a generated data pool is allocated outside the shared buffer space, and all data that is copied based on the packet from a sender port or priority using the transmission credits is counted against the generated data pool in an accounting of buffer space availability.

46. The device of claim 45 wherein the non-transitory memory is further configured for implementing a global multicast pool for storing a header of each of the copies of the packet, wherein the header is different than an original copy of the packet.

47. The device of claim 38 wherein the non-transitory memory is further configured for copying the packet to generate copied packets, generating headers of the copied packets, and allocating a global multicast pool, wherein the global multicast pool is configured for receiving the generated headers of the copied packets including counting the generated headers of the copied packets only against the global multicast pool in an accounting of buffer space availability.

48. The device of claim 38 wherein the packet is assigned to the shared buffer space if the shared buffer space has available space that is greater than or equal to the size of the packet, and the packet is assigned to the dedicated buffer space if the shared buffer space has available space that is less than the size of the packet.

49. A device comprising:
   a non-transitory memory for allocating:
      a dedicated buffer space based on ports and priority, and
      a shared buffer space, wherein a packet is assigned to the shared buffer space if the shared buffer space has available space that is greater than or equal to the size of the packet, and the packet is assigned to the dedicated buffer space if the shared buffer space has available space that is less than the size of the packet; and
   a processing component coupled to the memory, the processing component configured for processing the packet, wherein the non-transitory memory is further configured for copying data based on the packet thereby forming copied data, wherein a quantity of the copied data is utilized in calculating an amount of utilized buffer space while the copied data is being stored, and further wherein the amount of utilized buffer space is compared with one or more thresholds to establish a transmission rate.

50. A device for receiving a packet comprising:
   a non-transitory memory for:
      allocating a dedicated buffer space based on a plurality of ports and priority;
      allocating a shared buffer space thereby forming a plurality of shared buffer spaces, wherein each one of the shared buffer spaces is shared by a different set of two or more of the plurality of ports and each port of each of the sets is able to use any portion of the shared buffer space that the set that includes the port shares;
      copying the packet to generate copied packets;
      generating headers of the copied packets; and
      allocating a global multicast pool, wherein the global multicast pool is configured for receiving the generated headers of the copied packets including counting the generated headers of the copied packets only against the global multicast pool in an accounting of buffer space availability; and
   a processing component coupled to the memory, the processing component configured for processing the packet.

51. The device of claim 50 wherein the packet is assigned to the shared buffer space if the shared buffer space has available space that is greater than or equal to the size of the packet, and the packet is assigned to the dedicated buffer space if the shared buffer space has available space that is less than the size of the packet.

52. The device of claim 51 wherein the non-transitory memory is further configured for updating an accounting scheme based on the assigning of the packet.

* * * * *

UNITED STATES PATENT AND TRADEMARK OFFICE
CERTIFICATE OF CORRECTION

PATENT NO.       : 10,050,896 B2
APPLICATION NO.  : 14/542509
DATED            : August 14, 2018
INVENTOR(S)      : Andrew Chao-Lung Yang, Jeffrey Alan Pangborn and Gerald Schmidt Page 1 of 1

It is certified that error appears in the above-identified patent and that said Letters Patent is hereby corrected as shown below:

In the Claims

In Claim 17, add - of - between "the assignment" and "the packet".

Signed and Sealed this
First Day of October, 2019

Andrei Iancu
*Director of the United States Patent and Trademark Office*